US009829032B2

(12) United States Patent
Hermes

(10) Patent No.: US 9,829,032 B2
(45) Date of Patent: Nov. 28, 2017

(54) WHEELCHAIR WITH SECURITY FEATURES

(71) Applicant: Jane Hermes, Louisville, KY (US)

(72) Inventor: Jane Hermes, Louisville, KY (US)

( * ) Notice: Subject to any disclaimer, the term of this patent is extended or adjusted under 35 U.S.C. 154(b) by 321 days.

(21) Appl. No.: 13/964,792

(22) Filed: Aug. 12, 2013

(65) Prior Publication Data
US 2014/0252747 A1    Sep. 11, 2014

Related U.S. Application Data

(60) Provisional application No. 61/682,888, filed on Aug. 14, 2012.

(51) Int. Cl.
| | | |
|---|---|---|
| *A61G 5/10* | (2006.01) | |
| *F16B 43/00* | (2006.01) | |
| *A61G 5/12* | (2006.01) | |
| *A61G 5/08* | (2006.01) | |

(52) U.S. Cl.
CPC ............ *F16B 43/00* (2013.01); *A61G 5/0816* (2016.11); *A61G 5/1062* (2013.01); *A61G 5/1091* (2016.11); *A61G 5/12* (2013.01); *A61G 5/122* (2016.11); *A61G 5/125* (2016.11); *A61G 5/128* (2016.11); *A61G 2200/16* (2013.01); *A61G 2203/70* (2013.01)

(58) Field of Classification Search
CPC ...... A61G 5/125; A61G 5/122; A61G 5/0816; A61G 5/1091; F16B 43/00
USPC ..................... 280/288.4, 291, 647
See application file for complete search history.

(56) References Cited

U.S. PATENT DOCUMENTS

| | | | | |
|---|---|---|---|---|
| 2,847,058 | A * | 8/1958 | Lee ........................ | A61G 5/022 188/74 |
| 4,917,395 | A * | 4/1990 | Gabriele .................. | A61G 5/08 280/250.1 |
| 5,240,276 | A * | 8/1993 | Coombs ................... | A61G 5/08 280/647 |
| 5,669,623 | A * | 9/1997 | Onishi ..................... | B62B 7/08 16/225 |
| 7,007,965 | B2 * | 3/2006 | Bernatsky ................ | A61G 5/12 280/250.1 |
| 7,114,743 | B2 * | 10/2006 | Kassai ..................... | B62B 7/08 280/647 |
| 7,128,332 | B2 * | 10/2006 | Hermes .................... | A61G 5/08 108/158.12 |
| 8,419,047 | B2 * | 4/2013 | Chen ....................... | A61G 5/08 280/639 |

* cited by examiner

*Primary Examiner* — Jacob Knutson

(57) ABSTRACT

Wheelchair designs and enhancements are provided for use with conventional wheelchair design. The designs and enhancements include bariatric extension panels and security features making it suitable for use in high security areas such as prisons and psychiatric wards.

12 Claims, 16 Drawing Sheets

WHEELCHAIR WITH SECURITY FEATURES

CROSS-REFERENCE TO RELATED APPLICATIONS

This Application claims the benefit of provisional patent Application No. 61/682,888 filed 2012 Aug. 14 by the present inventor.

BACKGROUND

Prior Art

The following is a tabulation of some prior art that presently appears relevant:

| U.S. Patents | | |
|---|---|---|
| Pat. No. | Issue Date | Patentee |
| 4,770,432 | September 1988 | Wagner |
| 4,917,395 | September 1990 | Graebe |
| 5,028,065 | Jul. 2, 1991 | Danecker |
| 7,182,356 | Sep. 6, 2002 | Haase |

Background

The present disclosure relates generally to wheelchair designs and more particularly to wheelchair designs and related enhancements that include one or more of the following advantageous structural and/or functional features: tamper resistant security features and extension parts to accommodate bariatric users. This wheelchair is used in prisons and psychiatric wards where security is essential.

Prisons are dangerous places. Security and the need to reduce potential violence are tantamount. Some residents of a psychiatric ward, a prison or a correctional institution need to use a wheelchair. Traditional wheelchairs create many problems relating to safety for guards and inmates alike. Traditional manual wheelchairs are hazardous in these institutions because they can be made into weapons and users can also carry contraband within them.

The same issues apply to psychiatric wards where the users may harm themselves as well as other inhabitants or caregivers.

Standard wheelchair construction comprises a welded tubular metal frame having seat and back elements of flexible material or fabric spanning the space between either side of the frame. Such construction is inherently unstable and dangerous in a prison environment.

Tubular parts can be disassembled, cut and made into shooting weapons. Notes or drugs can be hidden in any tubular part.

Metal parts can be sharpened and used for stabbing or spear like weapons. The fabric seat contains a strip of metal on each side. This metal allows the fabric to be bolted to the frame. Prisoners remove this metal strip. They sharpen this metal to produce a stabbing weapon and hide it. The bolts holding the fabric wear through the fabric in about one week. At this point the guards are able to detect the damage but many times are unable to find the hidden weapon.

Removable parts such as footrests are used as a battering weapon. This is a weapon of choice when there is a riot or fight. A footrest used in this fashion can even cause death.

Cavities are used to smuggle contraband such as drugs, cell phones, communication notes, or weapons.

Therefore care is to be taken to ensure that a wheelchair cannot be disassembled and its parts used to make weapons. Furthermore all material components and all connections of a wheelchair needs to be sufficiently strong to resist being broken and used as a weapon. Prisoners can use a heated wire to cut through thin plastics with low melting points and plastic foam. Prisoners also create a cutting tool with salt coated dental floss. This makeshift tool is able to cut through soft and thin plastic material.

Finally bariatric chairs for heavier and larger users have even more metal parts than traditional chairs. There are currently many more bariatric users in these institutions than in previous years and the numbers continue to grow larger. There is a need for a secure bariatric wheelchair.

Several security wheelchairs have been proposed. However the security issues were addressing the problem encountered at airports and other venues requiring transport through an x-ray machine rather than the problems encountered in prisons.

U.S. Pat. No. 4,770,432 to Wagner discloses a foldable wheelchair constructed of panels of skinned polymeric foam which are secured together by piano type hinges. These hinges require continued maintenance and can easily be disassembled in a prison environment. The polymeric foam can be easily broken apart with a swift kick of a booted foot or scored by tools commonly made by inmates.

U.S. Pat. No. 4,917,395 to Gabriele discloses a wheelchair having a hinge construction between the side panels and seat and back panels uses hinges that are easily disassembled and the molded panels can then be used as weapon parts. Additionally the parts are easily removed to allow for adjustment. Parts that can be removed are neither durable nor safe in this violent environment.

U.S. Pat. No. 5,028,065 to Daneker discloses a wheelchair made of foam with adjustable height. This wheelchair does not fold. Foam construction is not durable in a prison environment. The pieces can be easily broken. Prison cells are very small and wheelchairs need to fold so that they can fit inside a jail cell.

U.S. Pat. No. 7,182,356 to Haase discloses a wheelchair made of flexible material instead of metal so that it can be wheeled through x-ray metal detectors. This material is easy to tear apart or break and is not durable. Additionally this wheelchair is narrow and cannot accommodate a large individual.

U.S. Pat. No. 5,240,276 to Coombs discloses a foldable wheelchair construction with interchangeable right and left panels. The Coombs '276 design offers a simple and inexpensive construction for a wheelchair which may be assembled by relatively unskilled persons and which permits easy repair of broken parts. These parts include left and right side panels and two seat panels which together form the primary structure of the chair. The panels are made of a substantially rigid material, preferably injection molded polymer resin, and are held together in a chair configuration by means of interlocking fasteners. Additional frame stability is achieved by an interlocking pivotable lower support member, and a foldable stay member between the side panels. Wheels are attached in a conventional manner. The wheelchair of the Coombs '276 patent is easy to manufacture into a durable, rigid structure that virtually eliminates the primary causes of structural wheelchair failure, such as frame cracks and broken welds. The entire disclosure of the Coombs '276 patent is incorporated by reference.

Despite the highly advantageous features and functions of the wheelchair design(s) disclosed in the Coombs '276 patent, opportunities exist to improve upon features and functions thereof. The present disclosure is directed to Wheelchair design enhancements having particular applicability to wheelchair(s) of the general type disclosed in the Coombs '276 patent. However, the design enhancements of the present disclosure are not limited to the wheelchairs of the Coombs '276 patent, but have wide applicability to wheelchair design and manufacture, as will be apparent to persons skilled in the art.

U.S. Pat. No. 7,128,332 to Hermes discloses wheelchair design enhancements. The design enhancements include folding seat panels which are hingedly mounted to the wheelchair frame and offer interlocking functionality. Other design enhancements include pivotal, interlocking footrests and axle plate combinations. The entire disclosure of the Hermes U.S. Pat. No. 7,128,332 is incorporated by reference.

SUMMARY OF THE DISCLOSURE

The present disclosure is directed to wheelchair designs and enhancements thereof that offer advantageous structural and/or functional benefits for wheelchair manufacturers and wheelchair users. The wheelchair designs and associated enhancements disclosed herein include: 1) a wheelchair seat extension panel wherein right/left interchangeable seat extension panels can be added to seat components to accommodate a larger user. The contoured component is identical front and back so that the panels can be reversed to make a complete seat. 2) A wheelchair footrest extension component wherein right/left interchangeable foot rests component panels can be added to footrest components to accommodate a larger user. The said component is identical front to back so that the panels can be reversed to make a complete foot rest. 3) a wheelchair underarm seat extension component wherein right/left interchangeable underarm extension component can be added to seat underarm components to accommodate a larger user. The extension component is identical front and back so that the panels can be reversed to make a complete underarm component. 4) The backrest of an embodiment of the wheelchair is made from a cloth-like material which may be stretched tightly between frame members using Velcro straps fed around buckles. The backrest provides good support without providing pockets or cavities for smuggling contraband. 5) Hinge pins of predetermined length as a means to prevent being used as a weapon, made of a very tough material that resists carving or whittling into a sharp weapon and installed with lock washers that practically precludes the possibility of removing them. 6) Wheelchair components including foot rest and armrests which cannot be removed. 7) Wheelchair components made almost entirely out of hard polymer resins to allow for repeated cleaning with harsh chemicals and even autoclaving to sterilize the wheelchair. 8) Wheelchair components are solid in order to prevent hidden contraband or the manufacture of shooting weapons.

Additional structural and functional features and advantages of the disclosed wheelchair designs and associated enhancements will be apparent from the detailed description which follows, taken together with the appended figures.

CROSS REFERENCE TO RELATED APPLICATIONS

The present application claims the benefits of a commonly assigned, co-pending provisional patent application entitled wheelchair with security Features which was filed on Aug. 14, 2012 and assigned EFS ID 13491405 and Application Number 61682888. The entire contents of the foregoing provisional patent application are incorporated herein by reference.

BRIEF DESCRIPTION OF THE DRAWINGS

So that those having ordinary skill in the art to which the present disclosure appertains will have a better understanding of how to make and use the wheelchair designs of the present disclosure and enhancements thereof, reference is made to the drawings appended hereto, wherein.

DESCRIPTION

Figure 1:
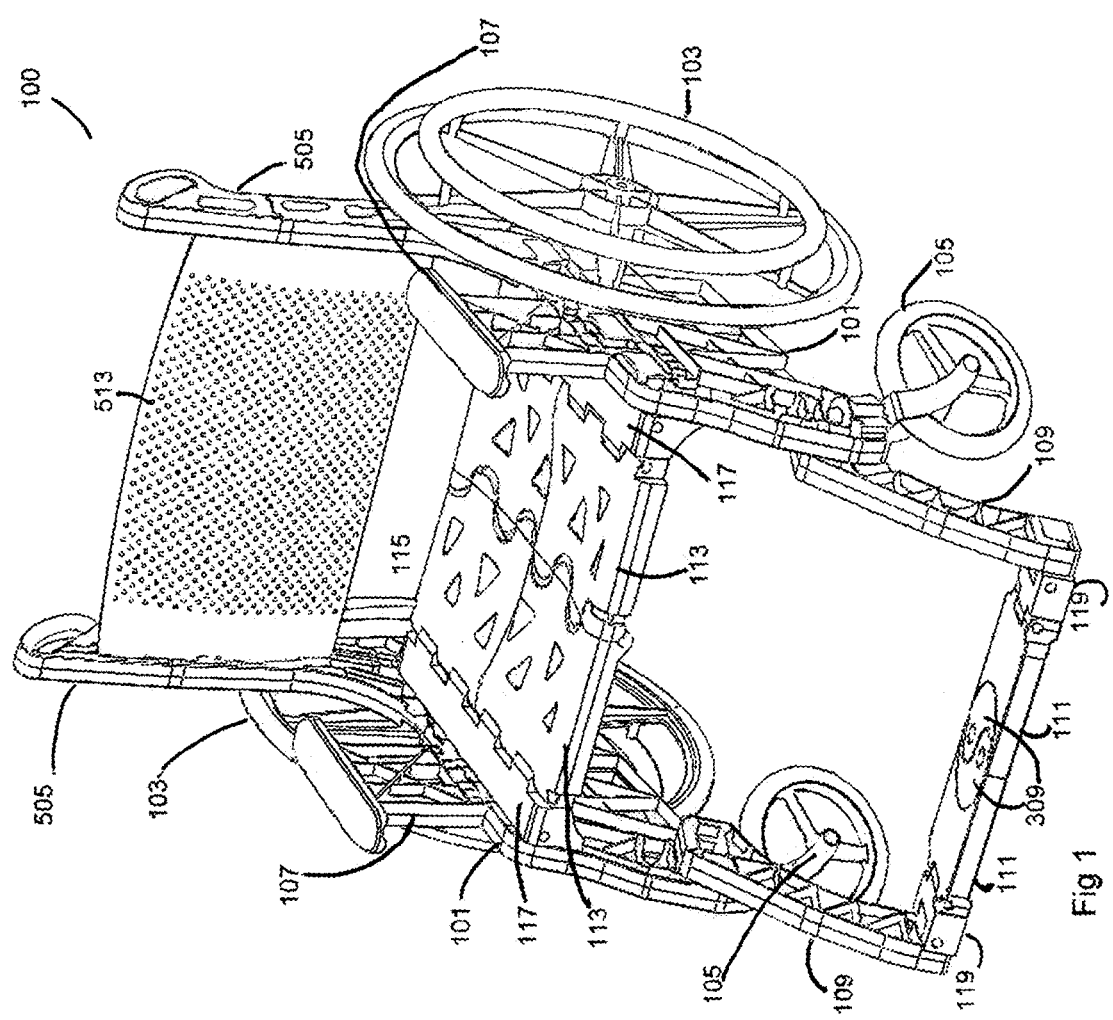
FIG. 1 is a perspective view of a wheelchair

FIGS. 1-16 shows a wheelchair 100 including tamper-proof features described in more detail below. The wheelchair 100 is made almost entirely from injection molded polymer resin which is impervious to harsh cleaning and sterilizing chemicals. The wheelchair 100 can be thoroughly cleaned using degreasers live steam, a pressure washer, or may even be autoclaved.

The wheelchair 100 is manufactured using substantially identical components for the left and right sides of the wheelchair 100. For instance, referring to FIG. 1 left and right side frames 101 are identical molded plastic parts, as are left and right large wheels 103; left and right caster wheels 105; left and right arm rests 107 (see FIG. 3); left and right leg supports 109; left and right foot rests 111; left and right seat 113; and left and right side bariatric seat extension, 117; left and right bariatric foot rest extension 119; and left and right bariatric lower arm support extension 303 (see FIG. 3). The bariatric foot rest extension 119 follows the same design and mounting concept as the bariatric seat extension 117 and will not be described in further detail.

Figure 3:
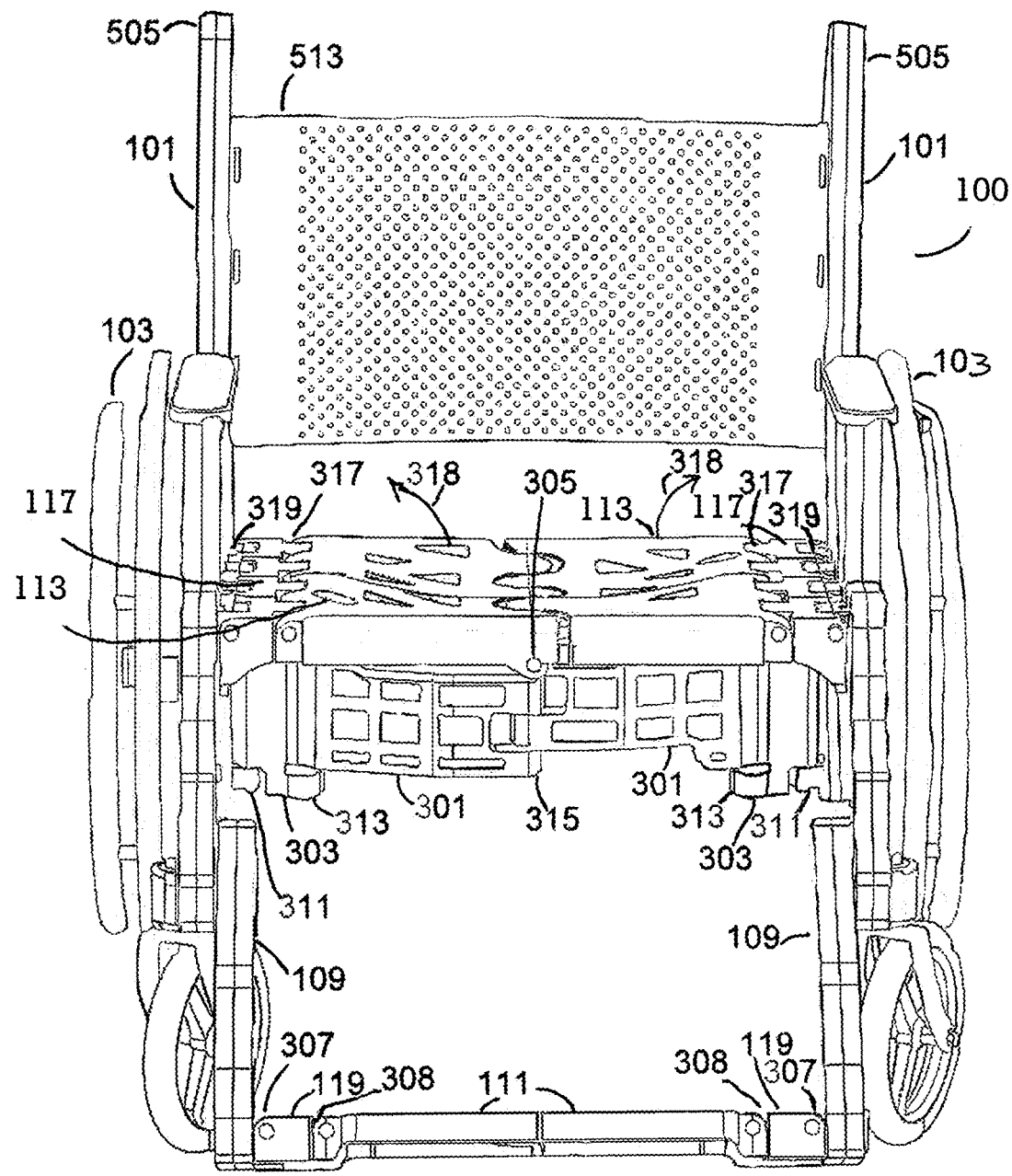
FIG. 3 is a front view of the wheelchair of FIG. 1

As best appreciated in FIG. 3, square hinge blocks 319 attach the seat extensions 117 to the side frames 101, respectively of the wheelchair 100. Inner bariatric seat extension hinges 317, hingedly connect the seat extensions 117 to the seat 113 respectively of the wheelchair 100. A mid-seat hinge 305, connects with a hinge to the seat 113. Likewise, a foot rest extension hinge 307 attaches the foot rest extensions 119 to the leg support 109 respectively, of the wheelchair 100. Inner footrest extension hinges 308 hingedly connect to the foot rest extensions 119 to the foot rests 111 respectively, of the wheelchair 100. Note that there is no mid footrest hinge. Instead, each of the foot rests 111 includes a semi-circular latch 309 which overlaps and cross-latches with the corresponding semi-circular latch. Of the other foot rests 111 such that they separate from each other to fold up and then mutually lock onto support each other when in the extended position shown in FIG. 3.

Finally a bariatric outer underarm hinge 311 attach the under arm support extensions 303 to the side frames 101, respectively of the wheelchair 100. Inner bariatric underarm extension inner hinge 313 hingedly connects the under arm support extension 303 to the under arm support 301 respectively of wheelchair 100. A mid lower frame support hinge 315 connects with a hinge to the under arm support 301.

As discussed in more detail later all of the hinges mentioned above are manufactured in substantially the same manner to prevent the ability of anyone to use the hinge pins as a weapon.

Figure 9:
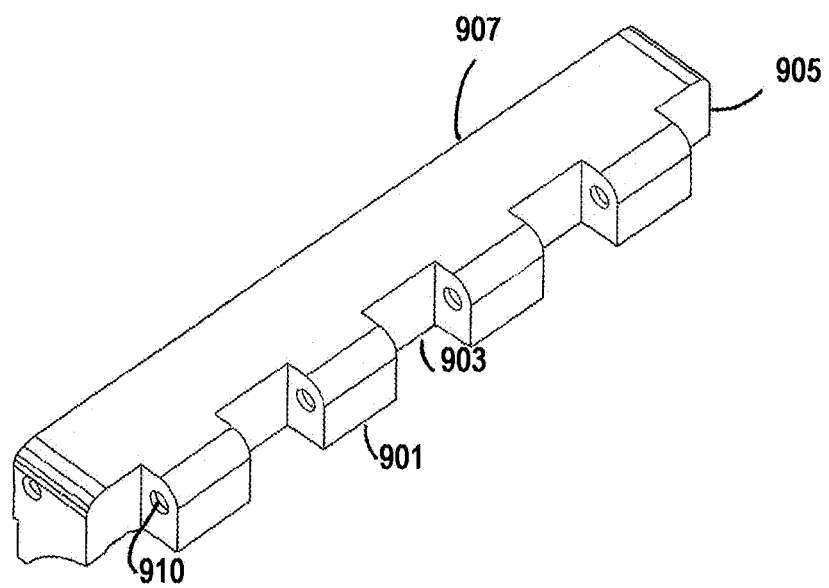
FIG. 9 is a perspective view of one of the bariatric seat extension pieces of FIG. 1
Figure 11:
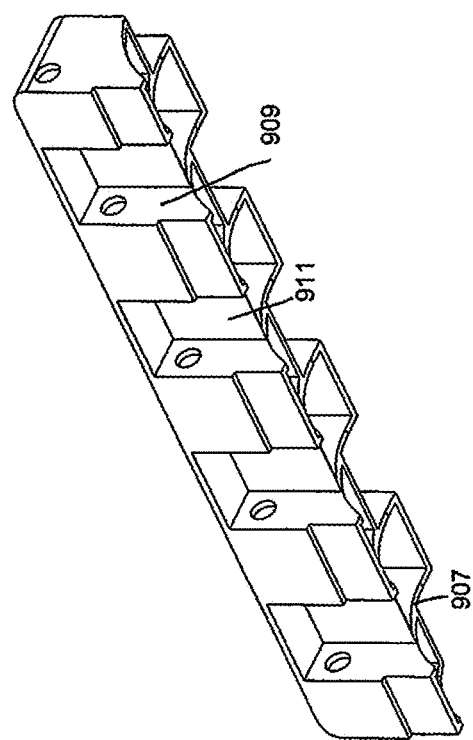
FIG. 11 is an opposite-end perspective view of the bariatric extension piece of FIG. 9
Figure 12:
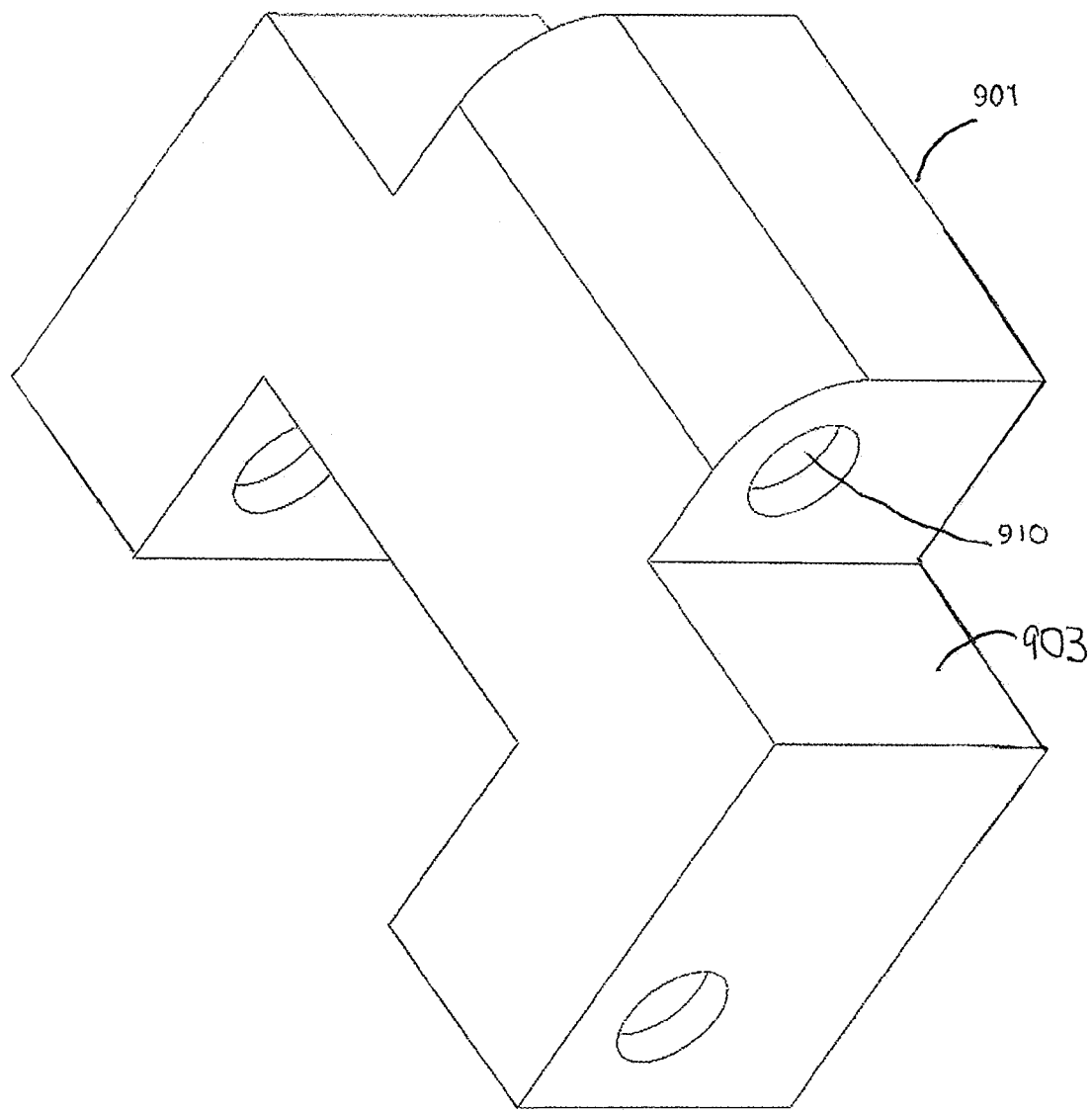
FIG. 12 Segmented bariatric seat extension

Referring now to FIG. 9 and FIG. 11, the seat extension 117 is a molded polymer body defining a plurality of hinge knuckle projections 909 and recesses 911 extending along its longitudinal dimension along a first side 905. An opposite side 907 also defines a plurality of projections 901 and a plurality of recesses 911 (see FIG. 11). Unlike the recesses 903 along the first side 905 of the seat extension 117, the plurality of recesses 911 along the second side 913 do not extend and project through the top surface of the seat extension 117. The plurality of recesses 911 receives hinge type projections on the corresponding side frame 101. Since the top portion of the bariatric seat extension 117 above the plurality of recesses 911 abuts the top surface of the hinge type projections of the side frame 101, the seat extension 117 cannot pivot upwardly along its second side 907 about its axis of attachment 701 (see FIG. 7) relative to the side frame 101. It should be noted that the bariatric seat extension 117 which is shown as a single molded piece in FIG. 9 and FIG. 11 can instead be manufactured as a plurality of segments placed end to end (see FIG. 12). This is schematically illustrated in FIG. 7 wherein the dotted line 703 shows where two such segments would meet shown in FIG. 12.

Figure 5:
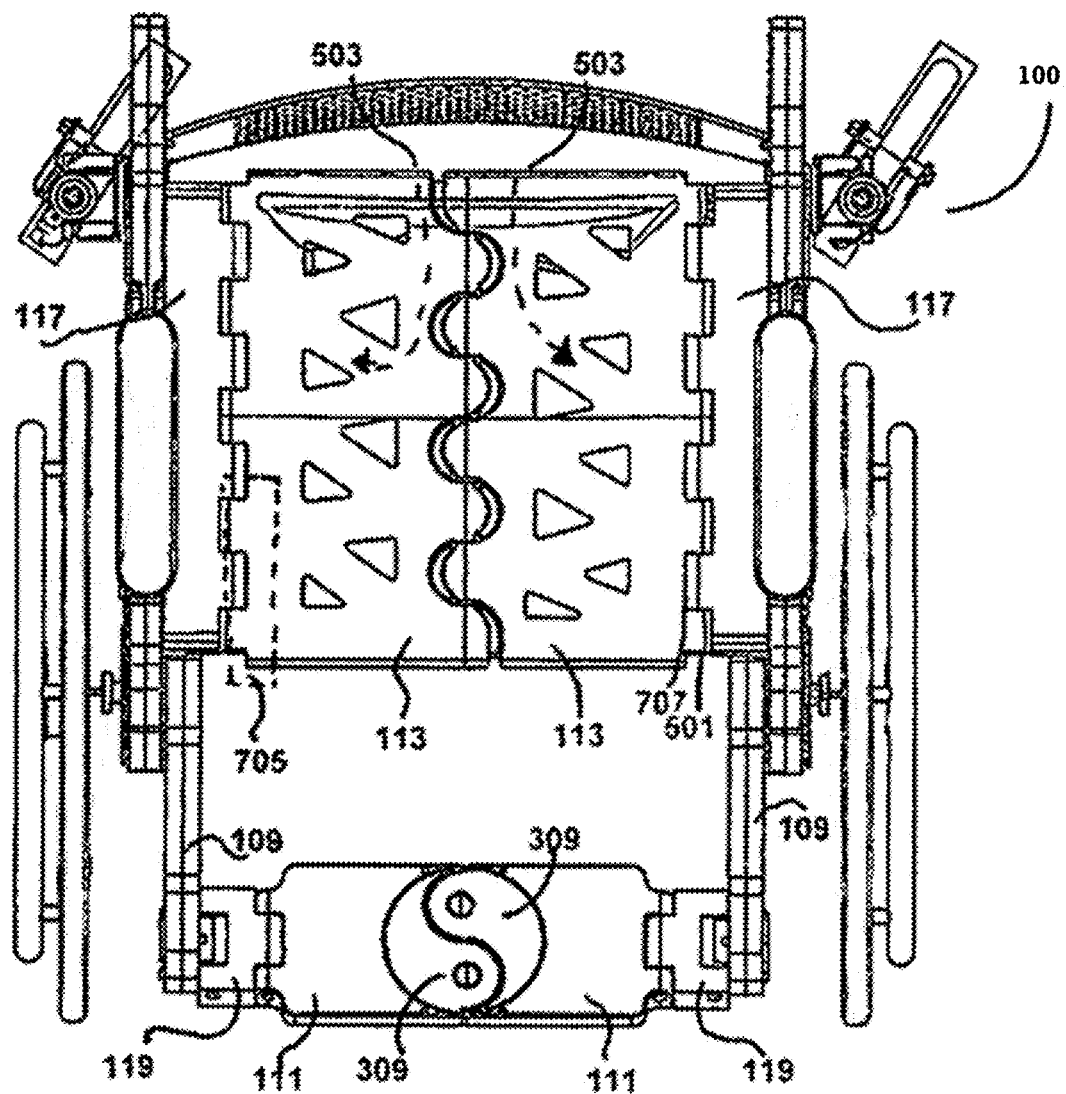
FIG. 5 is a plan view of the wheelchair of FIG. 3 but with the large wheels in the front and the small wheels in the back.
Figure 7:
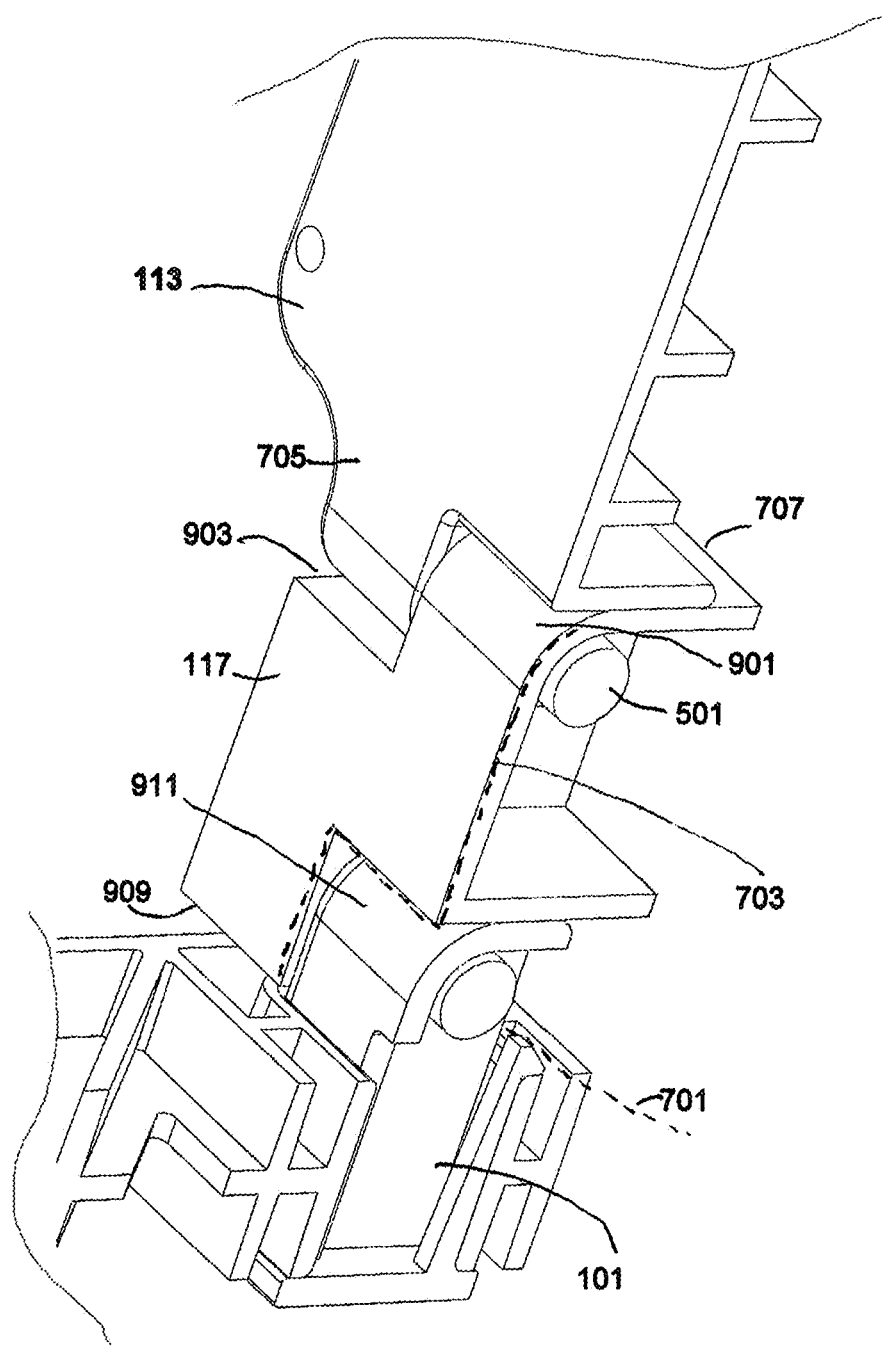
FIG. 7 is an enlarged section view through the seat, along line 115-115 in FIG. 1

Referring to FIG. 5 and FIG. 7, the seat 113 also defines a plurality of hinge projections 705 and recesses 707 which interlace with the corresponding recesses 903 and projections 901 of the seat extension 117 such that a rod 501 can be inserted through aligned openings 910 (FIG. 9) on the projections 901 of the seat extension 117 and openings 910 (see FIG. 13) on the hinge projections 705 of the seat 113 to form a hinged connection which allows the seat 113 to swing upward in the direction of the arrow 318 (see FIG. 3) so as to fold up the seat and collapse the wheelchair 100 to a stowed configuration.

The interlaced projections and recesses are configured so they do not permit the seat portion to pivot in the downward direction beyond a horizontal position.

Figure 13:
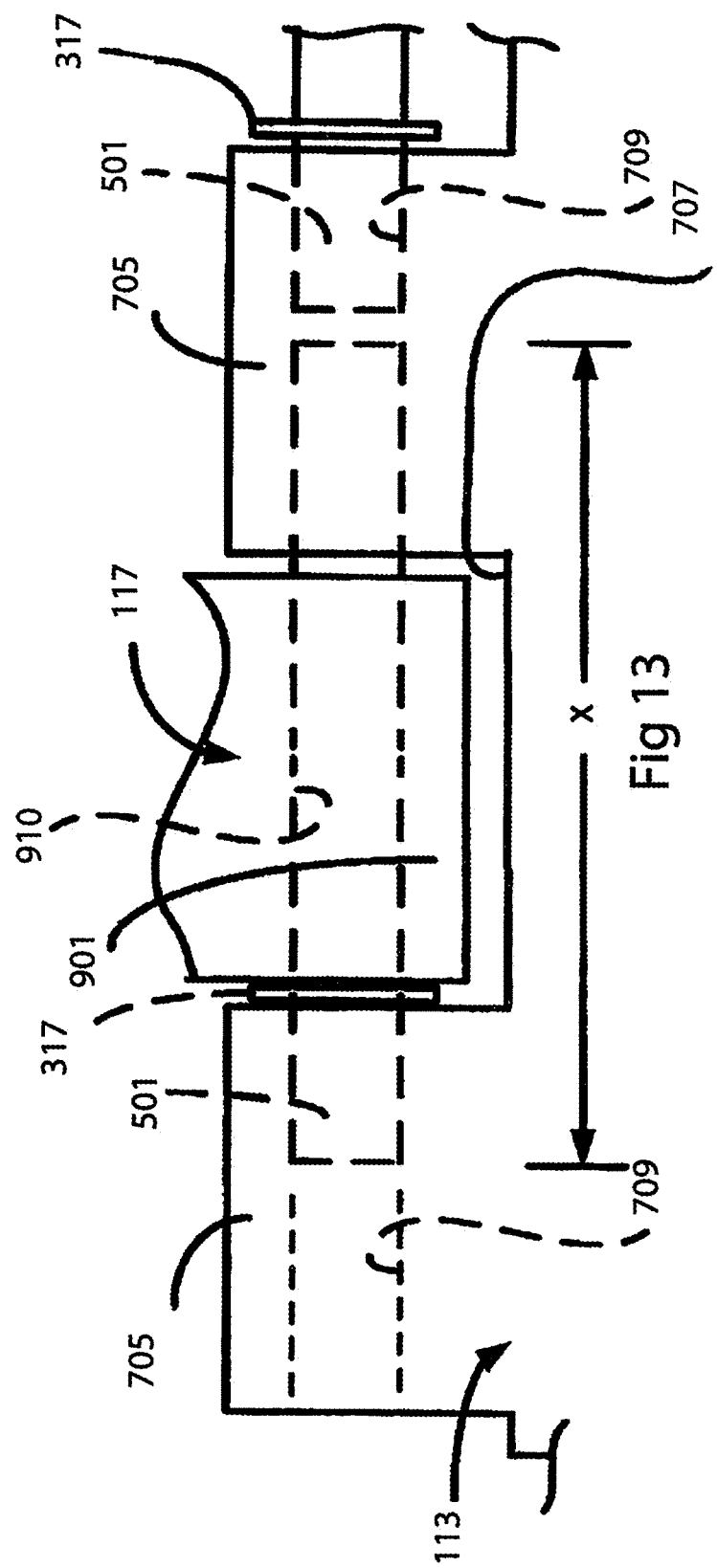
FIG. 13 is a broken away, plan view of a portion (inside the dotted rectangle) of the seat hinge of the wheelchair of FIG. 5.

Referring now to FIG. 11 and FIG. 13, the joint between the seat 113 and the bariatric seat extension 117 is pinned together by rods 501 arranged end to end. Each rod 501 is a cylindrical body which is just long enough to span the distance encompassing one hinge knuckle projection 901 of the seat extension 117 and one half each of the two adjacent hinge knuckle projections 705 of the seat 113. In this embodiment, that distance is approximately 4¼ inches, which is short enough to not lend itself to be used as a weapon, even if it could be removed from the wheelchair. The rod 501 has flat ends and is made from a very hard nylon. It is very difficult to sharpen the end of the rod 501 and create a weapon. Finally, a lock washer 721 is inserted through one of the ends 711 of the rod 501 to lock the rod 501 in place to further prohibit the removal of rod 501.

Figure 15:
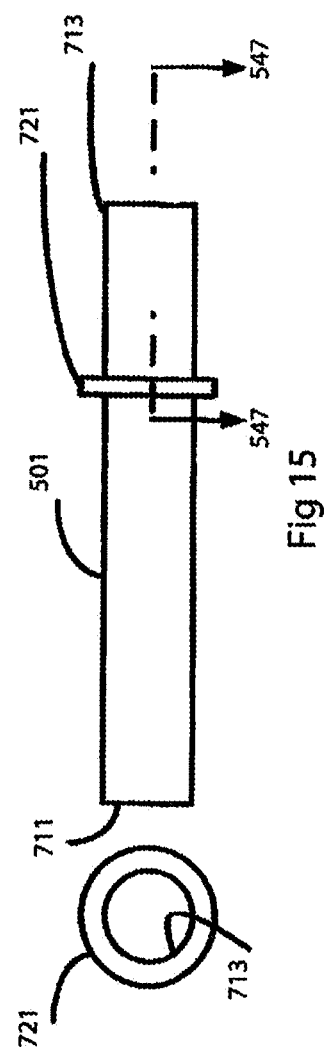
FIG. 15 is a partially exploded, side view of the hinge rod and the two lock washers of FIG. 13 with one of the lock washers on its side.
Figure 16:
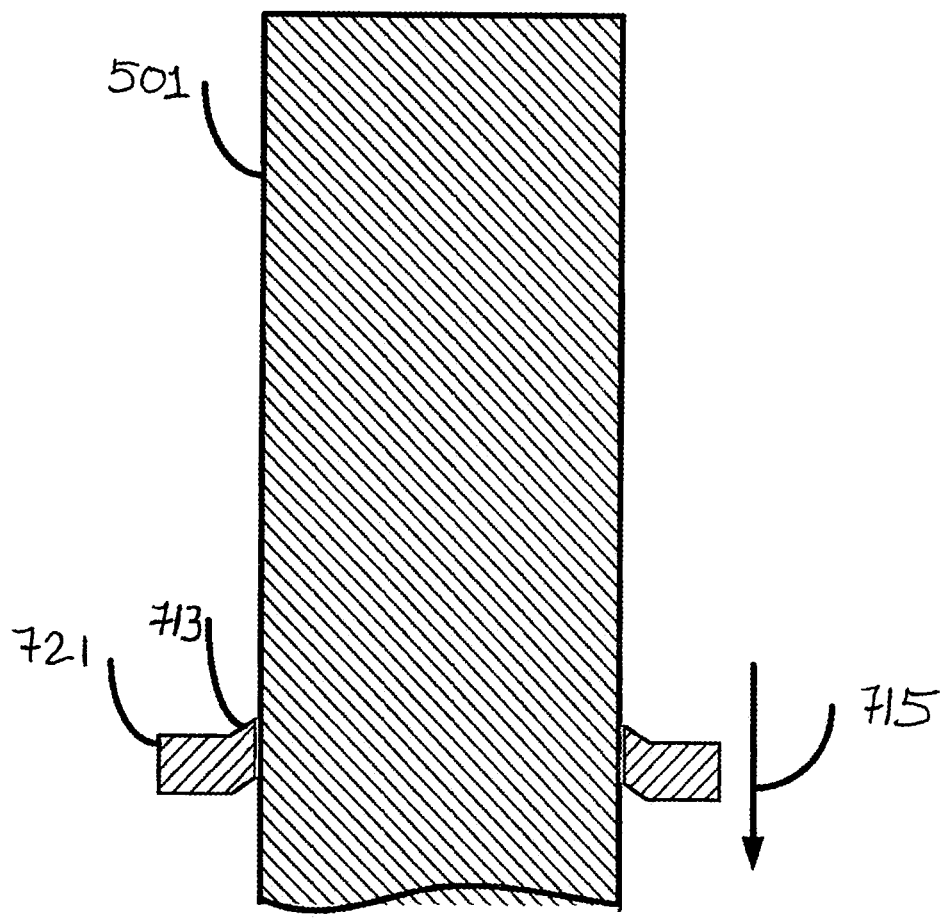
FIG. 16 a section view along line 547-547 of FIG. 15.

Referring to FIG. 15 and FIG. 16, the lock washer 721 has an interference fit with the rod 501 such that, when the lock washer 721 is pressed onto the rod 501 in the direction of the arrow 715 (See FIG. 16). The lock washer 721 deforms slightly at lock washer inner diameter 713. This deformation is enough to lock the washer 721 in place such that it is practically impossible to pull the lock washer 721 back out (in the direction opposite to the arrow 715) without destroying the lock washer 721. The outside diameter of the lock washer 721 is larger than the inside diameter of the aligned openings 910, and opening 709 through the hinge knuckle projections 901 and 705 which prevents the rod 501 from being removed from the joint once it is installed. In addition, since the rod 501 is recessed (see FIG. 13) inside the hinge knuckle projections (901 and 705) of the bariatric seat extension 117 and of the seat 113, it is practically impossible to access the lock washer 721 without cutting or destroying the rod 501. Thus the joint is made secure so it is very difficult if not impossible to disassemble, and even if it is disassembled, the rods 501 are too short and too tough to be converted for use as weapons. Thus rods 501 and lock washers 721 constitute a means for preventing hinges to be converted to weapons.

Very similar short nylon rods 501, secured at both ends with lock washers 721 are used for all the hinge joints of the wheelchair 100. This renders the wheelchair 100 tamper-proof. Since this is a rod and not a tube, it cannot be used to hide contraband nor be removed to become a shooting weapon.

It will also be obvious that eliminating the bariatric seat extensions 117 (see FIG. 1), the bariatric foot rest extensions 119, and the bariatric under arm support extension 303 (see FIG. 3) results in a standard size wheelchair. In that instance, the seat 113 are connected by hinges directly to the side frames 101 and are able to swing upwardly in the direction of the arrows 318 (see FIG. 3) to fold the standard size wheelchair up for transport or storage. Likewise the footrests 111 are connected by hinges to the leg support 109 and are able to swing in the direction of the dotted arrow 503 (See FIG. 5).

Figure 6:
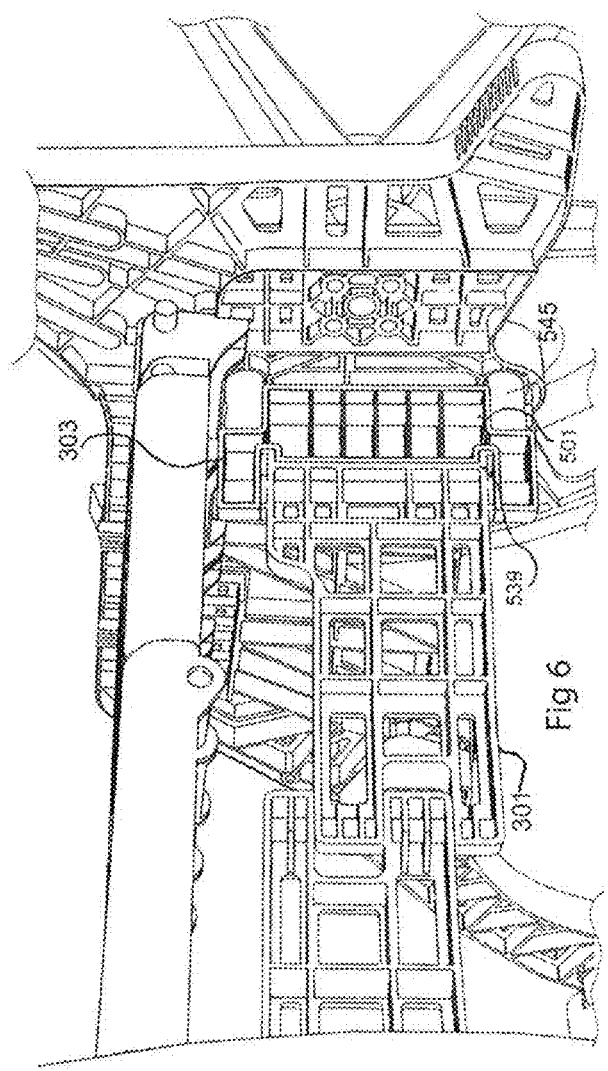
FIG. 6 is an enlarged section view of the underarm extension attachment
Figure 8:
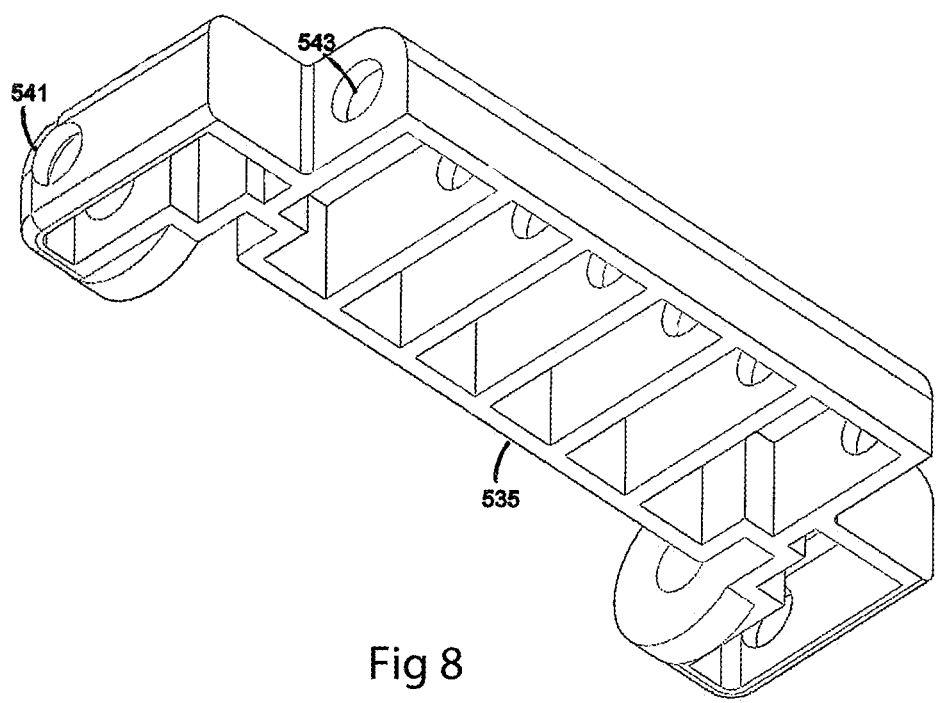
FIG. 8 is a perspective view of the bariatric underarm extension

Referring now to FIG. 8 and FIG. 6 the inner edge 535 of the underarm support extension 303 is placed against an outer edge 539 of the underarm support 301. Holes 542 are aligned with the holes in the underarm support 301 and small rods 501 with lock washers 721 are installed. Holes 543 are aligned with round pegs 545 and small rods 501 with lock washers 721 are inserted.

Figure 4:
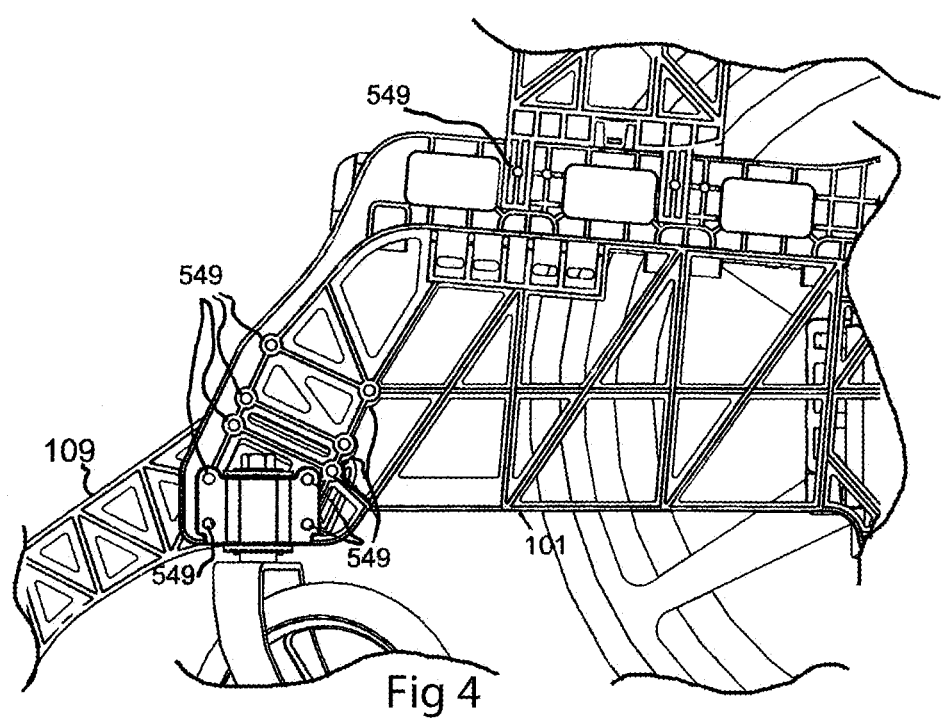
FIG. 4 is a lateral, enlarged sectional view of the leg support, side, and armrest

Referring now to FIG. 4, the side frame 101 abuts to leg support 109 and is connected by a plurality of screw and tamper proof nuts through a plurality of holes 549. Prior to bolting, the screw threads are coated with a liquid to prevent unscrewing. It should be appreciated that one way screws or tamper proof screws could be used instead of tamper proof nut with the same results. This renders the footrest tamper proof since they cannot be removed and used as a battering weapon.

Still referring to FIG. 4, holes 549 are drilled into the side frame 101 and armrest 107. Finally the same process of inserting screws, applying adhering liquid and screwing tamper proof nuts onto the screw renders the armrest tamper proof. Additionally all screws and nuts used to attach a brake assembly are applied in an identical fashion.

Figure 2:
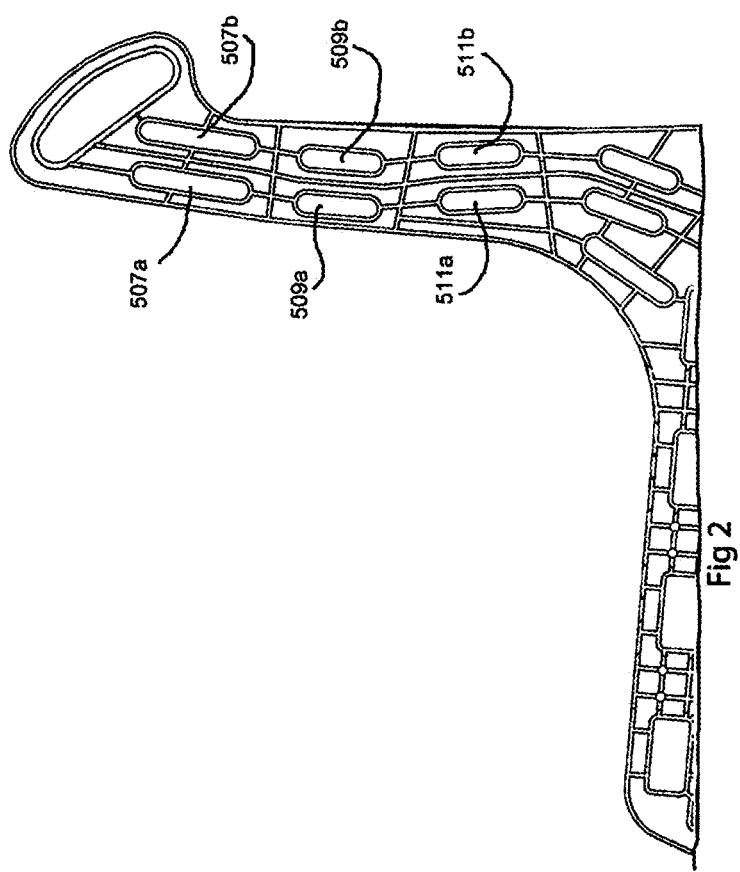
FIG. 2 is a lateral view of the upper push handle

Referring now to FIG. 2, each of the side frames 101, incorporates an upper push handle 505. The upper push handle 505 defines a plurality of paired, slotted openings 507a, 507b, 509a, 509b, 511a, 511b for securing and releasing the backrest 513 to the wheelchair 100 as described in more detail below.

The backrest 513 is made from plastic mesh or similar material which is stretched tightly between the upper push handle 505 using a buckle 517 secured to a webbing strap 518. Each combination buckle 517 and webbing strap 518 is fed through a corresponding set of paired slotted openings 507a, 507b, 509a, 509b, 511a, 511b, then the hook and loop strap 515 is threaded through the buckle and secured back onto itself as described below.

Figure 10:
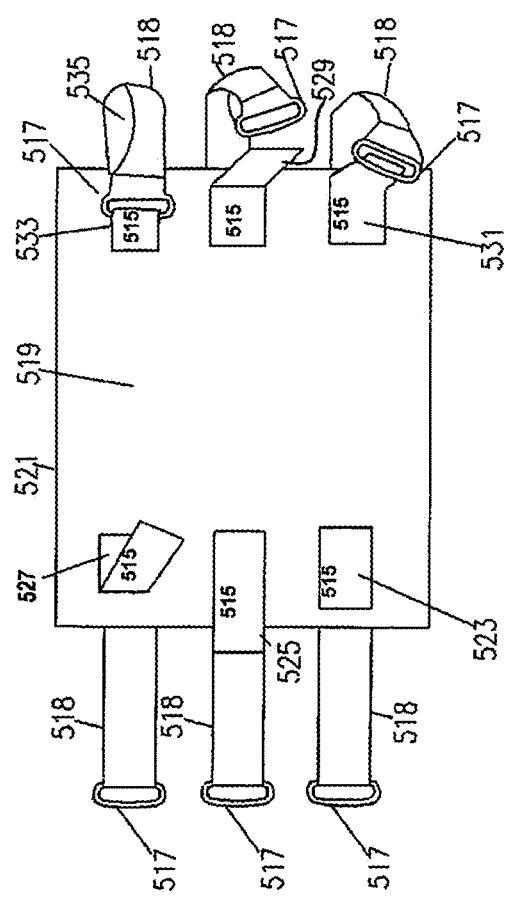
FIG. 10 is a perspective view of the backrest after it has been folded. It shows 6 buckles and Velcro straps indicating the process of the Velcro strip being inserted into the buckle.

Referring to FIG. 17, the backrest 513 is a rectangular piece of cloth like plastic mesh material 519 which is folded back onto itself at the fold line 521 to make the substantially rectangular shaped, double-layered backrest 513 shown in FIG. 10. It may be noted that the front and rear layers of the double-layered backrest 513 are attached to each other at the fold line 521 which is physically oriented at the top of the backrest 513 when installed onto the upper push handle 505 of the wheelchair 100 as shown in FIG. 2. The other three sides of the backrest 513 are totally open so there is no possibility for someone to hide or smuggle contraband between the two layers of the backrest 513. Any items place between the two layers will simply fall out through the open bottom of the backrest 513.

Figure 14:
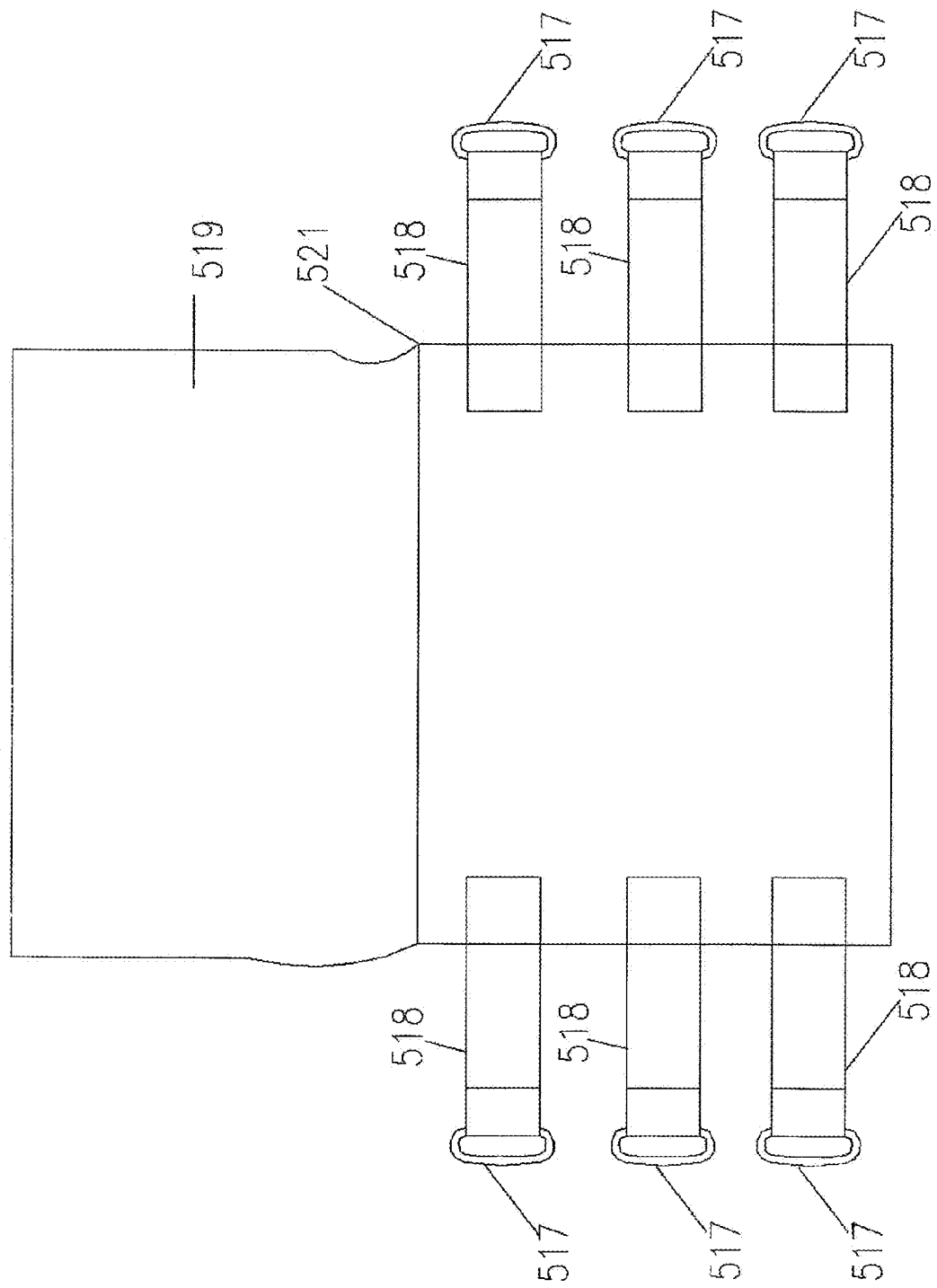
FIG. 14 is a perspective view of the backrest of the wheelchair of FIG. 1 when the backrest is in the fully unfolded, uninstalled position.

Referring to FIG. 14 and FIG. 10, it may be appreciated that the plurality of buckles 517 are secured via webbing straps 518 to the rear layer of the backrest 513 while the hook and loop straps 515 are secured to the front layer of the backrest 513 such that when the two layers are folded together as shown in FIG. 10 each buckle 517 substantially aligns with its corresponding hook and loop strap 515. (The plurality of buckles 517 and webbing straps 518 could be on the front layer of backrest 513 and the hook and loop straps 515 on the back layer of the backrest 513).

While the above description contains many specifics, these should not be construed as limitations on the scope of any embodiment, but as exemplifications of various embodiments thereof.

It will be obvious to those skilled in the art that various modifications may be made to the embodiment described above without departing from the scope of the invention as claimed.

The invention claimed is:

1. In a wheelchair that includes right and left sides and right and left seat panels, an improvement comprising: (a) a first bariatric seat extension panel that is hingedly mounted with respect to said right side and hingedly mounted with respect to said right seat panel as a means for increasing the width of said wheelchair (b) a second bariatric seat extension panel that is hingedly mounted with respect to said left side and hingedly mounted with respect to said left seat panel as a means for increasing the width of said wheelchair; the first and the second bariatric seat extension panels defining at least one projection and one recess; wherein said first projection is configured and dimensioned to cooperate in an integrated relationship with said respective side and with said respective seat extension panel; and in the wheelchair that includes left and right leg rest sides and left and right footrest panels, the improvement comprising: (a) a first bariatric footrest extension pivotally mounted with respect to said right leg rest side and hingedly mounted with respect to said right foot rest panel as a means for increasing the width of said wheelchair (b) a second bariatric footrest extension pivotally mounted with respect to said left leg rest side and hingedly mounted with respect to said left foot rest panel as a means for increasing the width of said wheelchair; the first and the second bariatric footrest extension panels defining at least one projection and one recess wherein said first projection is configured and dimensioned to cooperate in an integrated relationship with said respective leg rest side and with said respective foot rest extension panel; and in the wheelchair that includes the right and left sides and right and left underarm panels, the improvement comprising: (a) a first bariatric underarm extension panel that is hingedly mounted with respect to said right side and hingedly mounted with respect to said right underarm panel as a means for increasing the width of said wheelchair (b) a second bariatric underarm extension panel that is hingedly mounted with respect to said left side and hingedly mounted with respect to said left underarm panel as a means for increasing the width of said wheelchair; the first and the second bariatric underarm extension panels defining a hinge on inner and outer side.

2. A wheelchair according to claim 1, wherein each of said bariatric seat extension panels defines a predetermined thickness; the thickness is selected to provide a substantially smooth transient between said contoured seat panels and said bariatric seat extension panels.

3. A wheelchair according to claim 1, wherein said bariatric seat extension panels are configured and dimensioned with mirror like symmetry, such that 180 degree rotation permits integration with either right or left contoured seat extension panel and right or left side panel.

4. A wheelchair according to claim 1, wherein said bariatric seat extension panels are configured to prevent the inner hinge connecting the seat extension panel to said respective contoured seat panel to pivot.

5. A wheelchair according to claim 1, wherein each of said bariatric seat extension panels define a hinge pin area on both sides; the hinge pin area provides the at least one projection and one recess; the projection and said recess interrelates to a projection and a recess found in said contoured seat panel on one side; likewise the projection and said recess found on the opposite side of the bariatric seat extension interrelates to a projection and a recess found in said side panel.

6. In a wheelchair that includes left and right leg rest sides and left and right footrest panels, a improvement comprising: (a) a first bariatric footrest extension pivotally mounted with respect to said right leg rest side and hingedly mounted with respect to said right foot rest panel as a means for increasing the width of said wheelchair (b) a second bariatric footrest extension pivotally mounted with respect to said left leg rest side and hingedly mounted with respect to said left foot rest panel as a means for increasing the width of said wheelchair; the first and the second bariatric footrest extension panels defining at least one projection and one recess wherein said first projection is configured and dimensioned to cooperate in an integrated relationship with said leg rest side and with said foot rest panel; the wheelchair wherein said bariatric foot rest extension defines a predetermined thickness; the thickness is selected to provide a substantially smooth transient between the footrest panels and said bariatric footrest extensions; in the wheelchair that includes right and left sides and right and left seat panels, the improvement comprising: (a) a first bariatric seat extension panel that is hingedly mounted with respect to said right side and hingedly mounted with respect to said right seat panel as a means for increasing the width of said wheelchair (b) a second bariatric seat extension panel that is hingedly mounted with respect to said left side and hingedly mounted with respect to said left seat panel as a means for increasing the width of said wheelchair; the first and the second bariatric seat extension panels defining at least one projection and one recess; wherein said one projection of said seat extension panels is configured and dimensioned to cooperate in an integrated relationship with said respective side and with said respective seat panel; and in the wheelchair that includes the right and left sides and right and left underarm panels, the improvement comprising: (a) a first bariatric underarm extension panel that is hingedly mounted with respect to said right side and hingedly mounted with respect to said right underarm panel as a means for increasing the width of said wheelchair; (b) a second bariatric underarm extension panel that is hingedly mounted with respect to said left side and hingedly mounted with respect to said left underarm panel as a means for increasing the width of said wheelchair; left and right bariatric underarm extension panels defining a hinge on inner and outer side.

7. A wheelchair according to claim 6, wherein said bariatric footrest extension panels are configured and dimensioned with mirror like symmetry, such that 180 degree rotation permits integration with either the right or left footrest panel and right or left leg rest panel.

8. A wheelchair according to claim 6, wherein said bariatric footrest extension panels are configured to prevent the inner hinge connecting said the footrest extension panel to said respective footrest panel to pivot.

9. A wheelchair according to claim 6, wherein each of said bariatric footrest extension panels define a hinge pin area on both sides; the hinge pin area provides the at least one projection and one recess; the projection and said recess interrelates to one projection and recess found in said footrest panel on one side; likewise the projection and recess found on the opposite side of the bariatric seat extension interrelates to one projection and recess found in a leg rest panel.

10. In a wheelchair that includes right and left sides and right and left underarm panels, an improvement comprising: (a) a first bariatric underarm extension panel that is hingedly mounted with respect to said right side and hingedly mounted with respect to said right underarm panel as a means for increasing the width of said wheelchair; (b) a second bariatric underarm extension panel that is hingedly mounted with respect to said left side and hingedly mounted with respect to said left underarm panel as a means for increasing the width of said wheelchair; the first and the second bariatric underarm extension panels defining a hinge on inner and outer side; the wheelchair wherein said bariatric underarm extension defines a predetermined thickness; the thickness is selected to provide a substantially smooth transient between said underarm panels and bariatric underarm extension panels; and in the wheelchair that includes left and right leg rest sides and left and right footrest panels, the improvement comprising: (a) a first bariatric footrest extension pivotally mounted with respect to said right leg rest side and hingedly mounted with respect to said right foot rest panel as a means for increasing the width of said wheelchair (b) a second bariatric footrest extension pivotally mounted with respect to said left leg rest side and hingedly mounted with respect to said left foot rest panel as a means for increasing the width of said wheelchair; the first and the second bariatric footrest extension panels defining at least one projection and one recess wherein said one projection is configured and dimensioned to cooperate in an integrated relationship with said respective leg rest side and with said respective foot rest panel; in a wheelchair that includes the right and left sides and right and left seat panels, the improvement comprising: (a) a first bariatric seat extension panel that is hingedly mounted with respect to said right side and hingedly mounted with respect to said right seat panel as a means for increasing the width of said wheelchair (b) a second bariatric seat extension panel that is hingedly mounted with respect to said left side and hingedly mounted with respect to said left seat as a means for increasing the width of said wheelchair; the first and second bariatric seat extension panels defining at least one projection and one recess; wherein said one projection of the left and right bariatric seat extension panels is configured and dimensioned to cooperate in an integrated relationship with said respective side and with said respective seat panel.

11. A wheelchair according to claim 10, wherein said bariatric underarm extension panels are configured and dimensioned with mirror like symmetry, such that 180 degree rotation permits integration with either the right or left underarm panel and right or left underarm extension side panel.

12. A wheelchair according to claim 10, wherein said bariatric underarm extension panels are configured with a hinge pin on each side; the inner hinge connecting said underarm extension panel to said respective underarm panel is configured to prevent the hinge to pivot.

* * * * *